United States Patent [19]

Dueker et al.

[11] 3,904,871

[45] Sept. 9, 1975

[54] TARGET LOCATING CIRCUIT USING A LATERAL PHOTOELECTRIC DIODE

[75] Inventors: James E. Dueker, Florissant; Richard H. Glaenzer, University City, both of Mo.

[73] Assignee: The United States of America as represented by the Secretary of the Navy, Washington, D.C.

[22] Filed: July 5, 1974

[21] Appl. No.: 486,250

[52] U.S. Cl. .............. 250/211 J; 250/203; 250/209
[51] Int. Cl.² ......................................... H01J 39/12
[58] Field of Search ............ 250/211 J, 203 R, 208, 250/209, 206, 214 R

[56] References Cited
UNITED STATES PATENTS

| | | |
|---|---|---|
| 3,028,500 | 4/1962 | Wallmark ........................ 250/211 J |
| 3,638,025 | 1/1972 | Dishington et al. ............. 250/203 R |
| 3,644,739 | 2/1972 | Wilkinson et al. ................... 250/209 |
| 3,649,122 | 3/1972 | Holtz .................................... 250/209 |
| 3,718,821 | 2/1973 | Vischulis ............................. 250/209 |

*Primary Examiner*—Walter Stolwein
*Attorney, Agent, or Firm*—R. S. Sciascia; R. E. O'Neill

[57] ABSTRACT

The invention disclosed in the application refers to a method of signal processing and circuitry coupled to a lateral photoelectric diode to accurately determine the position of a target from the output of the lateral photoelectric diode using a unique characteristic of the diode. The approach utilizes the innate transmission delay line property of the lateral photoelectric diode.

8 Claims, 7 Drawing Figures

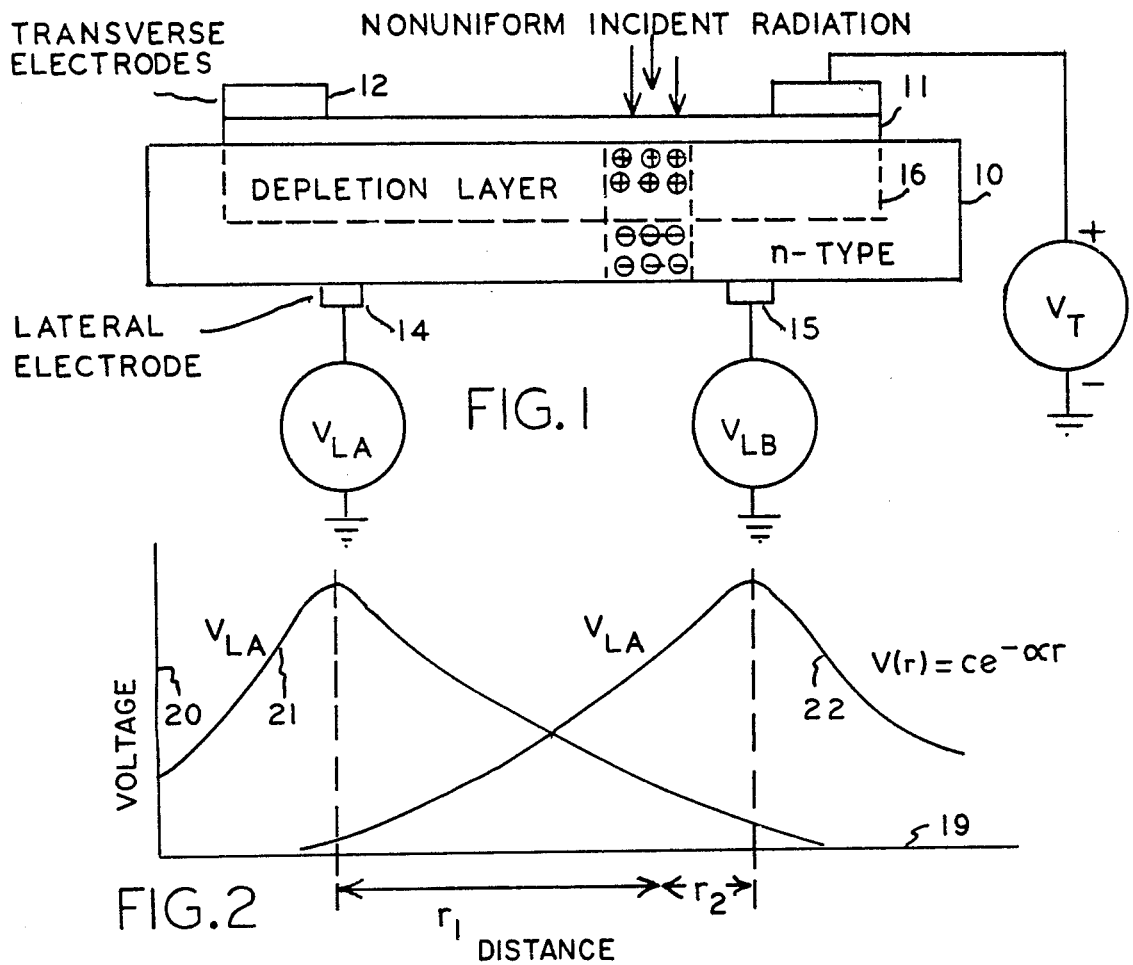
FIG. 1
FIG. 2
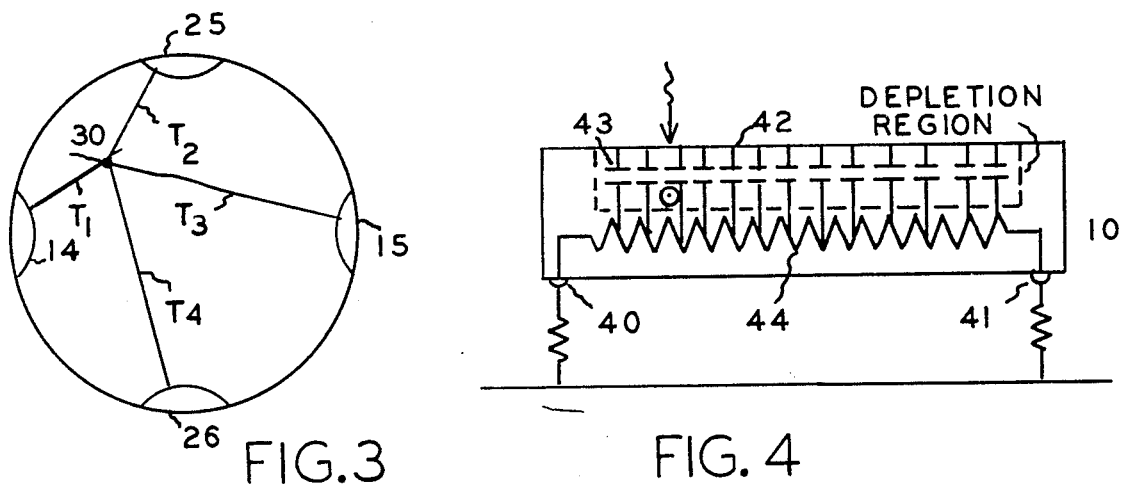
FIG. 3
FIG. 4

TARGET LOCATING CIRCUIT USING A LATERAL PHOTOELECTRIC DIODE

The invention described herein may be manufactured and used by or for the Government of the United States of America for governmental purposes without the payment of any royalties thereon or therefor.

The basic lateral photoelectric diode is described in U.S. Pat. No. 3,369,124 issued Feb. 13, 1968 to J. E. Dueker inventor of the present invention disclosed in this application. A description of the device is as follows.

The construction and operation of a lateral photoelectric diode or (sensitive wafer element) formed by two layers of a material having different conductivity characteristics, a plurality of spaced electrodes attached to one of said layers defining an observation field therebetween, and another electrode attached to the other layer and positioned extending around the observation field, the other electrode being located outwardly on the element relative to the aforementioned electrodes. The diode circuit includes voltage sensitive means connected between selected pairs of the plurality of electrodes to determine the location of a light spot impinging thereon, and other voltage sensitive means connected between the other electrode and at least one of the plurality of electrodes to measure the intensity of the light spot. A modified form of the diode has another electrode on the same side of the wafer element as the plurality of electrodes and a metallic coating on the opposite side of said element, the intensity of light impinging on the element being measured by means connected between the other electrode and the metal coating.

Inherent with the lateral photoelectric diode is the property that when a spot of light impinges upon the metallic layer of the device, there is a finite time lapse depended upon the position of the spot of light and the travel of the electronic signal to the individual electrodes.

It is therefore an object of this invention to supply the necessary circuitry combined with a lateral photoelectric diode to determine the location of a target by signal processing.

It is further object of this invention to provide an improved target locating circuit which includes a lateral photoelectric diode which utilizes the inherent time delay characteristics of a lateral photoelectric diode between the time a signal is imaged upon the light sensitive surface of the diode and the time the corresponding electric signal reaches an electrode on the other side of the wafer.

It is still a further object of this invention to provide an improved target locating circuit comprising, a lateral photoelectric diode having first and second sides, the diode having a light sensitive surface on the first side, first, second, third and fourth electrodes positioned on the second side spaced from each other, a fifth electrode on the first side of the diode, means for biasing the diode coupled to the electrodes to cause a depletion region to exist within the diode, means for imaging a light source upon the active surface, means for interrupting the light source image at a predetermined rate, means connected to the first, second, third and fourth electrodes to measure the time of arrival at the first, second, third and fourth electrodes of electrical signals caused by the imaged light source on the active surface, and means for comparing the time of arrival at the first, second, third and fourth electrodes coupled to the first, second, third and fourth electrodes to display the position of the light source upon the active surface and thereby determining its location.

Still a further object of this invention is to provide an improved target locating circuit comprising, a lateral photoelectric diode having first and second sides, the diode having a light sensitive surface on the first side, first, second, third and fourth electrodes positioned on the second side spaced from each other, a fifth electrode on the first side of the diode, means for biasing the diode coupled to the electrodes to cause a depletion region to exist within the diode, means for imaging a periodically fluctuating light source upon the active means, means for comparing the phase differential between the signal generated at the first, second, third and fourth electrodes, and means for displaying the phase differential between the first, second, third and fourth electrodes as position of the light source on the light sensitive surface of the lateral photoelectric diode.

Other objects, advantages and novel features of the invention will become apparent from the following detailed description of the invention when considered in conjunction with the accompanying drawings wherein:

FIG. 1, is a cross sectional view of a lateral photoelectric diode.

FIG. 2, shows the voltage curves at two of the electrodes on the lateral photoelectric diode.

FIG. 3, is a view of the light sensitive metallic layer of the diode.

FIG. 4, schematically shows the target line delay characteristics of the diode.

Figure 5:
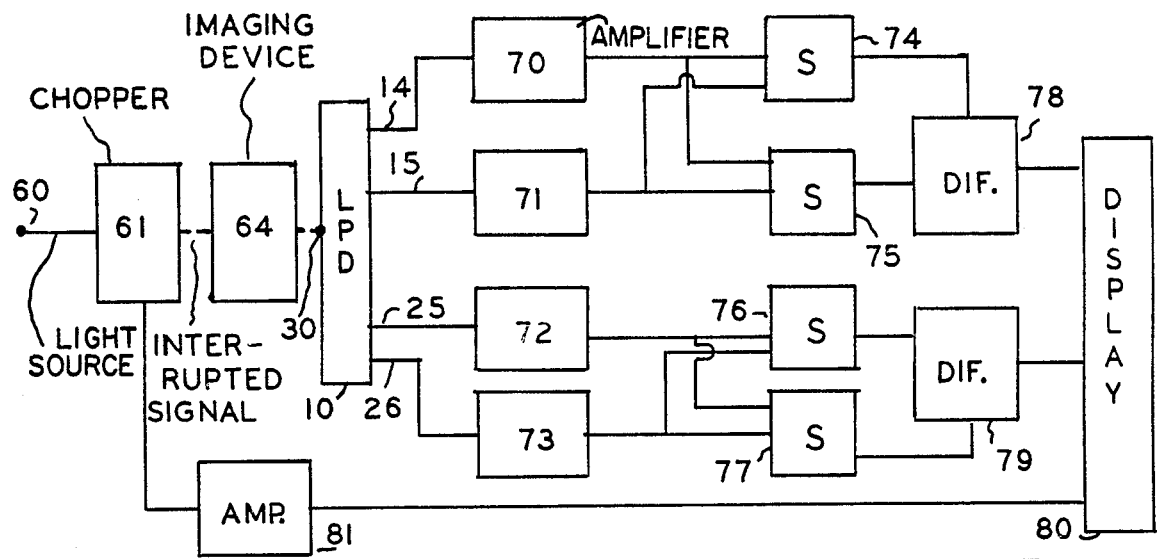

FIG. 5, shows the circuitry coupled to the electrodes to determine the target location from the signals at the electrodes.

Figure 6:
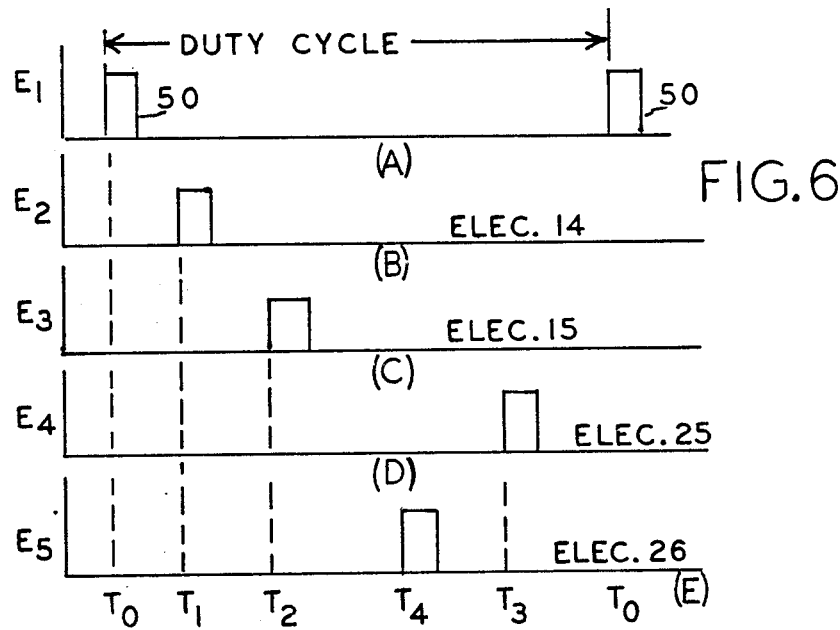

FIG. 6, shows the time relationship of the various signals.

Figure 7:
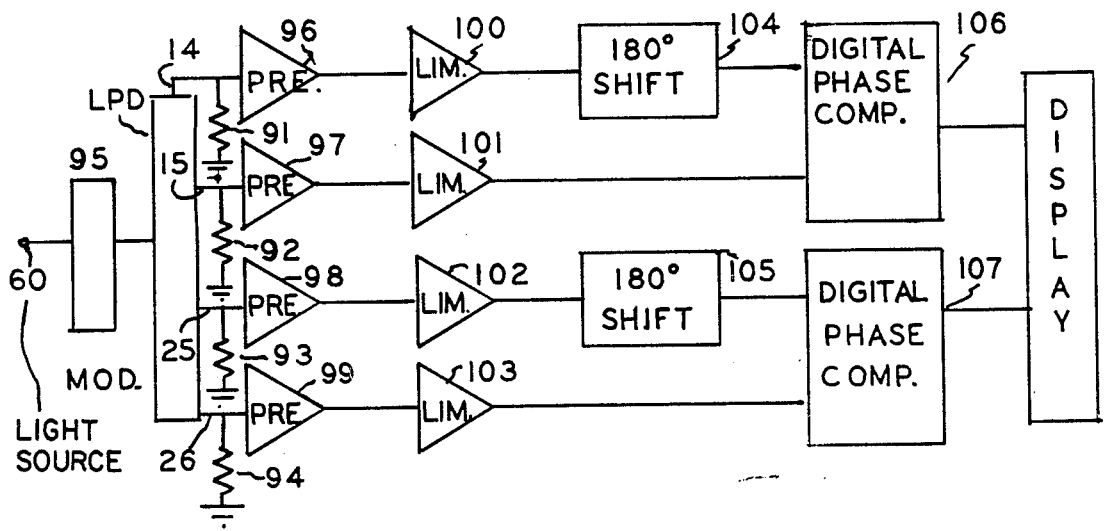

FIG. 7, is a second embodiment of the invention using phase shifting techniques.

The lateral photoelectric diode in cross section is shown in FIG. 1 and is composed of a body of N-type material 10. A second type of material is formed as a first wafer 11, on the N-type material. An electrode 12, is shown on the layer 11, and is biased by source 13, at a voltage sufficient to cause a depletion layer 16, to exist in 10. Two of four lateral electrodes, 14, 15, are shown formed on the lower side of the N-type material 10, and are coupled to voltage sources 17, 18.

The graph, FIG. 2, has distance on the horizontal axis 19, and potential on the vertical axis 20. The voltage at electrodes 14 (when a signal is received) is shown by the curve 21, and the voltage at electrode 15, by the curve 22.

FIG. 3, is a view looking at the four lateral electrodes, two of which are 14 and 15 and the other two are 25, 26 and show the distance relationship between the spot of incident light 30, and the electrodes. These are designated as T1, T2, T3, and T4.

FIG. 4, shows the lateral photoelectric diode schematically having electrodes 40, 41, plus the metallic layer 42. There is a resistance 43, of the material between electrodes 40, 41 plus the delay line characteristics of the depletion region shown by a series of small capacitors 43.

FIG. 5, includes a remote light source 60 and a chopper 61. A light beam 62, emanating from light source 60, in a continuous manner would come thru the chopper circuit 61, and is passed as an interrupting beam 63 to an imaging device 64. This device 64, focuses and images the interrupted signal on the lateral photoelectric diode light sensitive surface as previously discussed.

The four lateral electrodes 14, 15, 25, and 26 are shown connected to the diode 10 and are coupled to a series of amplifiers, 70, 71, 72 and 73. The individual output of the amplifiers are coupled to a series of integrators or flip flops, 74, 75, 76 and 77.

Each pair of lateral diodes output is then coupled from the flip flop to difference circuits 78 and 79 that in turn are coupled to the display device 80.

A signal is also taken from the chopper and fed thru an amplifier 81 that is coupled to the display device to give time zero for referencing purposes.

As the light source generates a signal from the diode, one or the other of each pair of lateral electrodes will receive a signal first in time. Assuming 14 receives the signal first, it is then amplified thru 70 and flip flop 74 is turned on while 75 is turned off. In time, then electrode 15 will receive a signal, amplifier 71 will amplify it and flip flop 75 will be turned on and 74 turned off. The signals from 74 and 75 are fed to the difference circuit 78 whose output in turn is sent to the display device which is referenced against the reference signal from amplifier 81. Similarly a signal is developing by the difference circuit 79.

FIG. 6, shows the sequential relationship between the various voltages generated by the diode.

FIG. 6 (A), shows the voltage signal 50 generated by the interrupted imaging of the light source on the active surface. The initial wave front of wave 50 is designated at $T_0$. The repetition rate is designated by the duty cycle designated as 51.

FIG. 6 (B), is the voltage generated at the electrode 14 and its initial wave front is shown as T-1, similarly, FIG. 6 (C) shows the signal generated at electrode 15 commencing at time T-2; FIG. 6 (D) is the signal at electrode 25 commencing at T-3; FIG. 6 (E), is the signal at electrode 26 commencing at T-4. The voltage generated at the electrodes will repeat as the duty cycle of the interrupted imaging signal 50.

The net result in the display device is to indicate the reference signal and the two difference signals which accurately record and display the position of the spot on the photosensitive circuit.

FIG. 7, shows a second embodiment of the invention wherein the location of source of light is determined in a phase sensing method. The circuitry there shown shows the lateral photoelectric diode 10 having the four electrodes, 14, 15, 25, and 26 equally loaded by resistors 91, 92, 93, and 94. The light source 60 which impinges upon the lateral photoelectric diode has either a sinusoidally characteristic or it is modulated by a modulator 95 to have a sinusoidally characteristic. The signals are amplified thru preamplifiers 96, 97, 98 and 99 and fed to limiting amplifiers 100, 101, 102 and 103. The signals from limiting amplifiers 100 and 102 are phase shift 180° by phase shifters 104 and 105 and the output of phase shifter 104 and limiting amplifier 101 are fed to a digital phase computer 106. Similarly, the output of phase shifter 105 and limiting amplifier 103 are fed to a digital phase computer 107. The purpose of the 180° phase shifter is to keep the data from having to pass from 0° to -1° (359°) which is not a good operating condition for the phase computer. The digital phase computers are coupled to a digital display device 108, the phase difference between the two sets of input signals gives the location of the light source since the time of arrival at the four lateral electrodes will be different and the sine waves across the four resistors will be out of phase.

Obviously many modifications and variations of the present invention are possible in the light of the above teachings. It is therefore to be understood that within the scope of the appended claims the invention may be practiced otherwise than as specifically described.

We claim:
1. An improved target locating circuit comprising:
   a. a lateral photoelectric diode having first and second sides;
   b. said diode having a light sensitive surface on said first side;
   c. first, second, third and fourth electrodes positioned on said second side spaced from each other;
   d. a fifth electrode on the first side of said diode;
   e. means for biasing said diode coupled to said electrodes to cause a depletion region to exist within said diode;
   f. means for imaging a light source upon said light sensitive surface;
   g. means for interrupting said light source image at a predetermined rate;
   h. means connected to said first, second, third and fourth electrodes to measure the time of arrival at said first, second, third and fourth electrodes of electrical signals caused by said imaged light source on said active surface; and,
   i. means for comparing said time of arrival at said first, second, third and fourth electrodes coupled to said first, second, third and fourth electrodes to display the position of said light source upon said light sensitive surface and thereby determining its location.

2. The improved target locating circuit of claim 1 wherein said first, second, third and fourth electrodes are uniformly spaced about said first side, said first and third electrodes being substantially the same distance from each other as said second and fourth electrodes.

3. The improved target locating circuit of claim 2 wherein said fifth electrode is substantially circular.

4. The improved target locating circuit of claim 3 wherein said biasing means is coupled to said fifth electrode.

5. The improved target locating circuit of claim 4 wherein said interrupting means causes light images from a remote source to fall upon the light sensitive surface in short pulses.

6. An improved target locating circuit comprising:
   a. a lateral photoelectric diode having first and second sides;
   b. said diode having a light sensitive surface on said first side;
   c. first, second, third and fourth electrodes positioned on said second side spaced from each other;
   d. a fifth electrode on the first side of said diode;
   e. means for biasing said diode coupled to said electrodes to cause a depletion region to exist within said diode;
   f. means for imaging a periodically fluctuating light source upon said light sensitive surface;

g. means for comparing the phase differential between the signal generated at the first, second, third and fourth electrodes; and, h. means for displaying said phase differential between said first, second, third and fourth electrodes as position of said light source on said light sensitive surface of said lateral photoelectric diode.

7. The improved target circuit of claim 6 wherein said periodically fluctuating light source is a sinusoidal wave configuration.

8. The improved target locating circuit of claim 7 wherein means are included for obtaining a reference signal from said modulating light source to compare the phase differential with the signal generated at first, second, third and fourth electrodes.

* * * * *